US008438198B2

(12) United States Patent
Gambin

(10) Patent No.: US 8,438,198 B2
(45) Date of Patent: May 7, 2013

(54) FILE SHARING DEVICE IN AN INTEGRATED CIRCUIT

(75) Inventor: Jean-Marc Gambin, Montrouge (FR)

(73) Assignee: Gemalto SA, Meudon (FR)

( * ) Notice: Subject to any disclaimer, the term of this patent is extended or adjusted under 35 U.S.C. 154(b) by 777 days.

(21) Appl. No.: 10/399,015

(22) PCT Filed: Oct. 25, 2001

(86) PCT No.: PCT/IB01/02010
§ 371 (c)(1),
(2), (4) Date: Aug. 12, 2003

(87) PCT Pub. No.: WO02/35483
PCT Pub. Date: May 2, 2002

(65) Prior Publication Data
US 2004/0030720 A1    Feb. 12, 2004

(30) Foreign Application Priority Data
Oct. 26, 2000   (FR) ...................................... 00 13766

(51) Int. Cl.
*G06F 17/30* (2006.01)
(52) U.S. Cl.
USPC ........................... 707/829; 707/812; 711/101
(58) Field of Classification Search ............... 707/8, 100, 707/205, 200, 201, 203, 101, 204, 10, 202, 707/609, 610, 655, 656, 659, 687, 695, 696, 707/704, 705, 758, 763, 790, 791, 793, 797, 707/803, 822, 828, 829, 830, 999.2, E17.01, 716, 726, 802, 812, 743–747, 795, 796, 999.1; 725/6; 902/4, 6; 711/1, 2, 147, 148, 149, 711/153, 202, 103, 100, 173, 101
See application file for complete search history.

(56) References Cited

U.S. PATENT DOCUMENTS

| 4,104,718 | A  | * | 8/1978  | Poublan et al. ................... 707/8 |
| 4,987,531 | A  | * | 1/1991  | Nishikado et al. ............ 707/200 |
| 5,012,405 | A  | * | 4/1991  | Nishikado et al. ................ 707/8 |
| 5,276,874 | A  | * | 1/1994  | Thomson ...................... 707/102 |
| 5,355,497 | A  | * | 10/1994 | Cohen-Levy ................ 707/200 |
| 5,787,445 | A  | * | 7/1998  | Daberko ....................... 707/205 |
| 5,799,307 | A  | * | 8/1998  | Buitron ........................ 707/100 |
| 5,832,527 | A  | * | 11/1998 | Kawaguchi ........................... 1/1 |
| 5,918,229 | A  | * | 6/1999  | Davis et al. ..................... 707/10 |
| 6,085,262 | A  | * | 7/2000  | Sawada .......................... 710/38 |
| 6,292,874 | B1 | * | 9/2001  | Barnett ........................ 711/153 |
| 6,301,582 | B1 | * | 10/2001 | Johnson et al. ........... 707/103 R |
| 7,308,433 | B1 |   | 12/2007 | Tomizawa |
| 7,809,779 | B2 | * | 10/2010 | Ahn et al. ..................... 707/828 |
| 7,865,506 | B1 | * | 1/2011  | Pedersen ...................... 707/726 |
| 2002/0152195 | A1 | * | 10/2002 | Bills et al. ......................... 707/1 |
| 2006/0253501 | A1 | * | 11/2006 | Langan et al. ................ 707/201 |

\* cited by examiner

*Primary Examiner* — Greta Robinson
(74) *Attorney, Agent, or Firm* — The Jansson Firm; Pehr B. Jansson

(57) ABSTRACT

The invention concerns an integrated circuit device including first and second memories, the two memories comprising files organized in respective tree structures. The invention is characterized in that one of the memories includes an indication of a path to at least one file in the tree structure of the other memory.

19 Claims, 4 Drawing Sheets

FILE SHARING DEVICE IN AN INTEGRATED CIRCUIT

FIELD OF THE INVENTION

This invention concerns an integrated circuit device including a memory with first and second memories, the two memories comprising files organized in respective tree structures.

The said devices are in particular portable devices called smart cards which are used especially in the field of health care, mobile telephony as well as banking.

BACKGROUND OF THE INVENTION

The said smart cards generally include a card body which holds an electronic module comprising the traditional control unit (e.g. a central processing unit or CPU) and at least one memory. In the various above-mentioned fields, techniques evolve more and more quickly, especially smart card techniques.

For example, in the field of mobile telephony, there are second generation cards and portable telephones as well as third generation cards and portable telephones. The first cards and telephones are designed for use on a GSM (Global System for Mobile communications) network. The said cards are compatible with the standard GSM TS 11.11, a standard published by a standardization institute called the ETSI. The second cards and telephones are designed for use on a GSM network but also on other networks such as UMTS (Universal Mobile Telecommunications System) or GPRS (General Packet Radio Service), standards published respectively by a standardization institute called 3GPP and by the ETSI. The said cards are therefore compatible with the standard GSM TS 11.11 as well as with the standard USTM TS 31.102 (card standard adapted for the UMTS network), standards published by the ETSI and 3GPP standardization institutes. In the third generation standard, the card includes memories concerning applications independent from each other. For example, we have a SIM application operating on a GSM network and a USIM application operating on a UMTS network, a banking application and an application operating on a GSM network, etc. Each of these applications has its own environment to operate autonomously. So, for example, each application has its own identification means such as keys, its own means of counting the units used during a telephone call, etc. The files in the tree structures of the various memories comprise the said means.

However, for simplicity of use, if a user has a card with a subscription that operates in a third generation portable telephone, he must also be able to use his card with the same subscription on a second generation portable telephone.

Consequently, the various applications use certain identical items of data, e.g. the telephone numbers, the units used during a telephone call, etc. Current techniques propose devices which store an image of the data in a first memory in a second memory, i.e. a copy of the tree structure files stored in the first memory is also stored in the second memory so that two different applications can use the same data.

The solution proposed by current techniques has the disadvantage of using a considerable amount of memory in the smart card, which may represent a problem due to the limited memory size in smart cards. Also, in order to ensure that the data and its image is coherent, means must be implemented to update the data as well as its image in the two memories. These means present the disadvantages of requiring considerable execution time and being difficult to manage since data must not be lost between consecutive updates of the two memories.

A technical problem to be solved by this invention is to propose an integrated circuit device including one memory which has first and second memories, the two memories comprising files organized in respective tree structures, which would reduce the amount of space taken up in the memory by the data and also reduce the time to update the data comprised in the files without losing the said data.

SUMMARY OF THE INVENTION

A solution to the technical problem posed is characterized in that one of the memories includes an indication of the path to at least one file in the tree structure of the other memory.

Consequently, as will be explained in detail below, the device of the invention provides optimized management of the card memory by indicating the path of a file since this indication is used to create a link between a file in one memory and another memory.

BRIEF DESCRIPTION OF THE DRAWINGS

The following description corresponding to the attached drawings, given as non limiting example, will clearly explain the purpose of the invention and how it can be achieved.

DETAILED DESCRIPTION OF THE INVENTION

Figure 1:
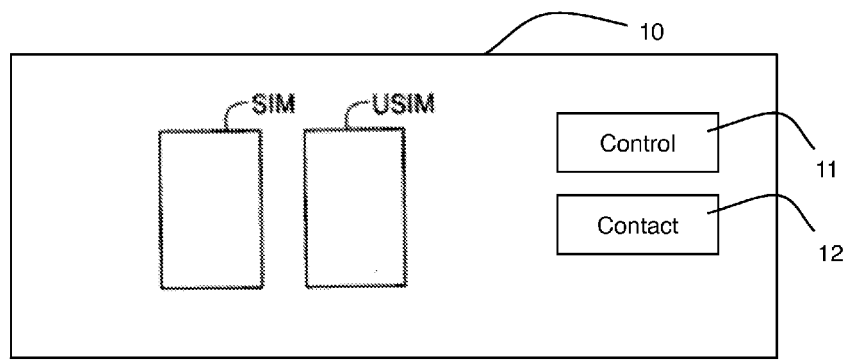
FIG. 1 is a diagram of an integrated circuit device according to the invention, in this case a smart card.

FIG. 1 shows an integrated circuit device 10, in this case a smart card. This card 10, comprises a control unit 11 (for example a central processing unit or CPU), a contact block 12 to provide electrical connections with for example a card reader connector and two Subscriber Identity Module (SIM) and Universal Subscriber Identity Module (USIM) memories.

Figure 2:
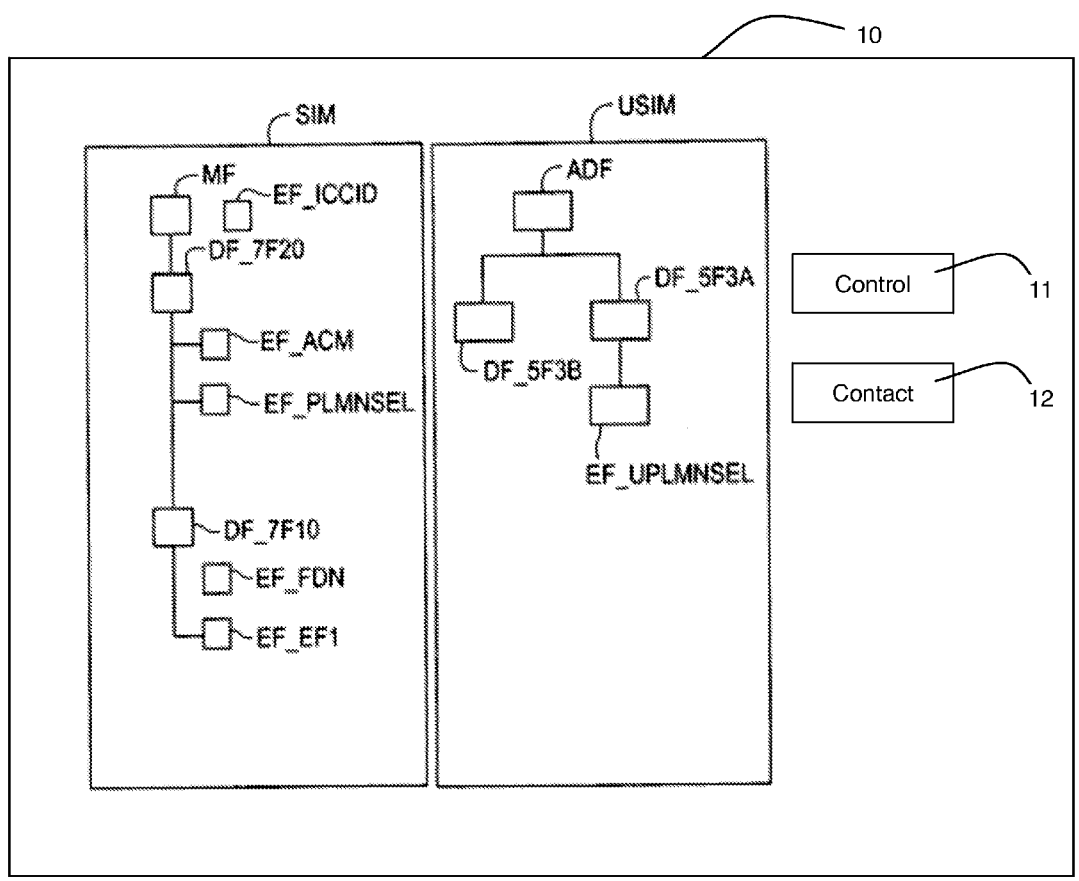
FIG. 2 is a diagram of two memories of the card in FIG. 1.

The said SIM and USIM memories are represented on FIG. 2. These are preferably erasable programmable memories. They include respectively file tree structures concerning two applications operating respectively on a second generation portable telephone and a third generation portable telephone.

The first SIM memory includes a file tree structure comprising a main folder MF with a first folder DF_7F20 and a file EF_ICCID which has a unique identification number associated with the card. The first folder DF_7F20 comprises a subfolder DF_7F10 and two files EF_PLMNSEL and EF_ACM comprising respectively data related to the networks accessible by the first SIM application and data related to a counter of the units used in the card during telephone calls. The subfolder DF_7F10 includes two files EF_FDN and EF_EF1 comprising respectively telephone numbers and messages received by the user for example.

The second USIM memory includes a file tree structure comprising a main folder ADF with two folders DF_5F3A and DF_5F3B. The first folder DF_5F3A comprises a file EF_UPLMNSEL comprising data related to the networks accessible by the second USIM application.

Figure 3:
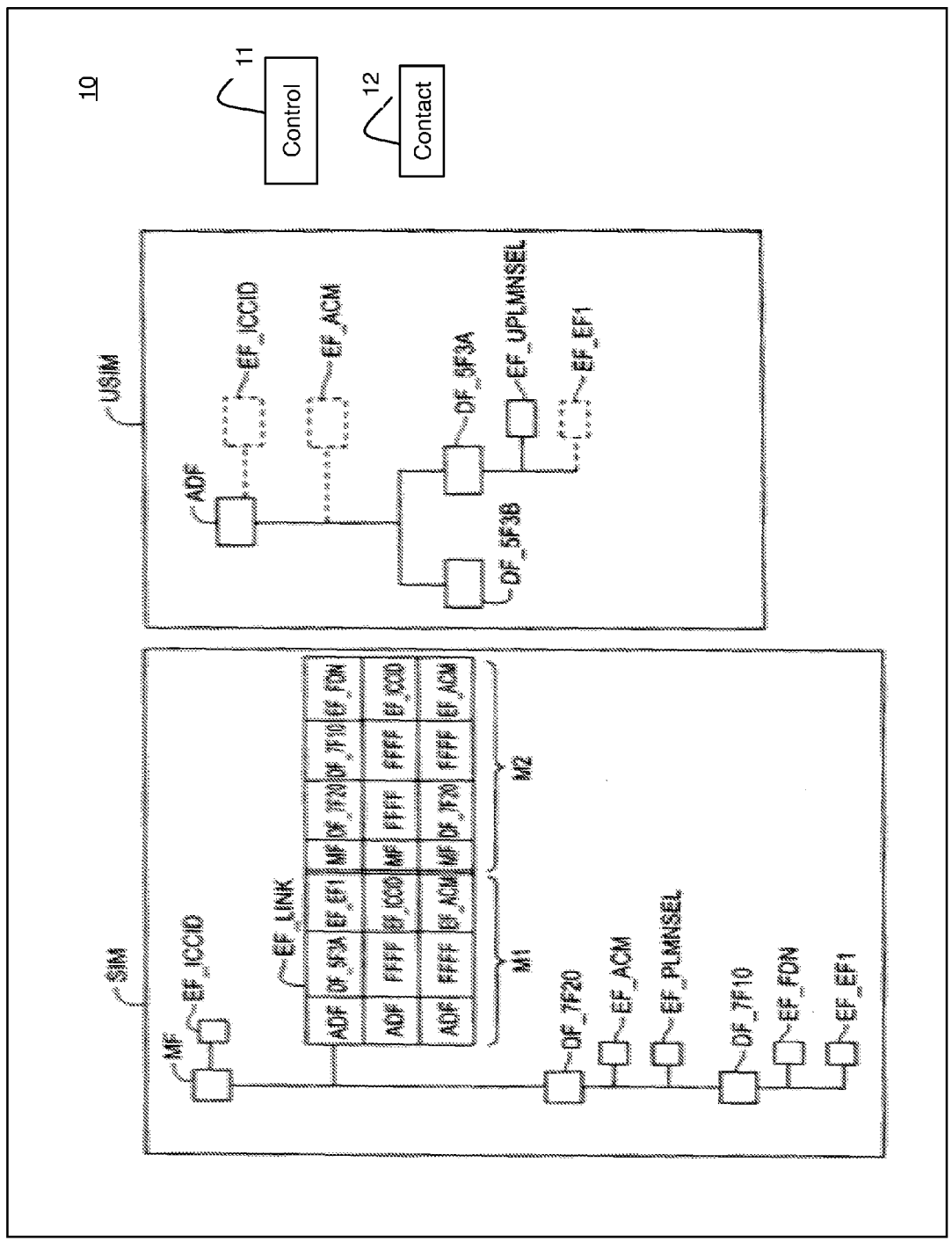
FIG. 3 is a diagram of a first method of producing the card of FIG. 1 according to the invention.

In order to use the same subscription of a third generation card in both third or second generation portable telephones, with the second USIM application it must be possible to use data identical to that used in the first SIM application. For example, as shown on FIG. 3, a subscription includes telephone numbers FDN, a single card identification number ICCID or a counter value ACM of units used in the card during telephone calls. This data is used by both applications. In the second USIM application, this data is held respectively in the files EF_EF1, EF_ICCID and EF_ACM. They correspond in the first SIM application to files EF_FDN, EF_ICCID and EF_ACM respectively.

To avoid duplicating this data in the card, one of the memories includes an indication of the path to at least one file in the other memory. The path indication includes at least one file or folder identifier, a folder being a special file comprising other files.

According to a first mode of realization, the first SIM memory includes a link file EF_LINK comprising an indication of the path to at least one file in the second USIM memory. For example, the path of the telephone number file EF_EF1 is ADF, DF_5F3A, EF_EF1. The link file EF_LINK also includes an indication of the path of the corresponding file in the first SIM memory, i.e. the file EF_FDN whose path is MF, DF_7F20, DF_7F10, EF_FDN. The same applies for the identification number file EF_ICCID and for the counter file EF_ACM whose respective paths in the second USIM memory are ADF, FFFF, EF_ICCID and ADF, FFFF, EF_ACM and in the first SIM memory are MF, FFFF, FFFF, EF_ICCID and MF, DF_7F20, FFFF, EF_ACM. For each path in the first SIM memory and the second USIM memory, respective memory areas M1 and M2 are used, respectively of n+1 and m+1 words, n>0 m>0 (one word equals two bytes), n and m being a number of folder selections to be made before reaching the required file, starting from the main folder. When a file is stored directly in the main folder, for example, the identification number file EF_ICCID is stored in the main folder MF, n−1 or m−1 words of the path are set to a value FFFF. One word is generally used for the identifier of the required file. The identifier of a file in a first memory is in fact sometimes not the same as that of the corresponding file in a second memory.

The memory physically storing the data is called the target memory, and that which does not physically store the data is called the source memory. In this case, the target memory is the first SIM memory, whereas the source memory is the second USIM memory. The files stored in the source memory will be called source files, and the files stored in the target memory will be called target files. The first SIM memory physically stores the telephone number file EF_FDN. Transparently for a card user therefore, the telephone number file EF_EF1 in the second USIM application is virtual, i.e. it has no physical existence in the said second USIM application.

Through this mechanism, not only is the amount of memory used in the smart card reduced, but also there is no longer any need for a complex system to update identical files in two memories. When the card user changes a telephone number, a single telephone number file EF_FDN is modified. Through the link file EF_LINK, the same telephone numbers are always used irrespective of the application used. The device according to the invention therefore provides optimized data sharing.

Figure 4:
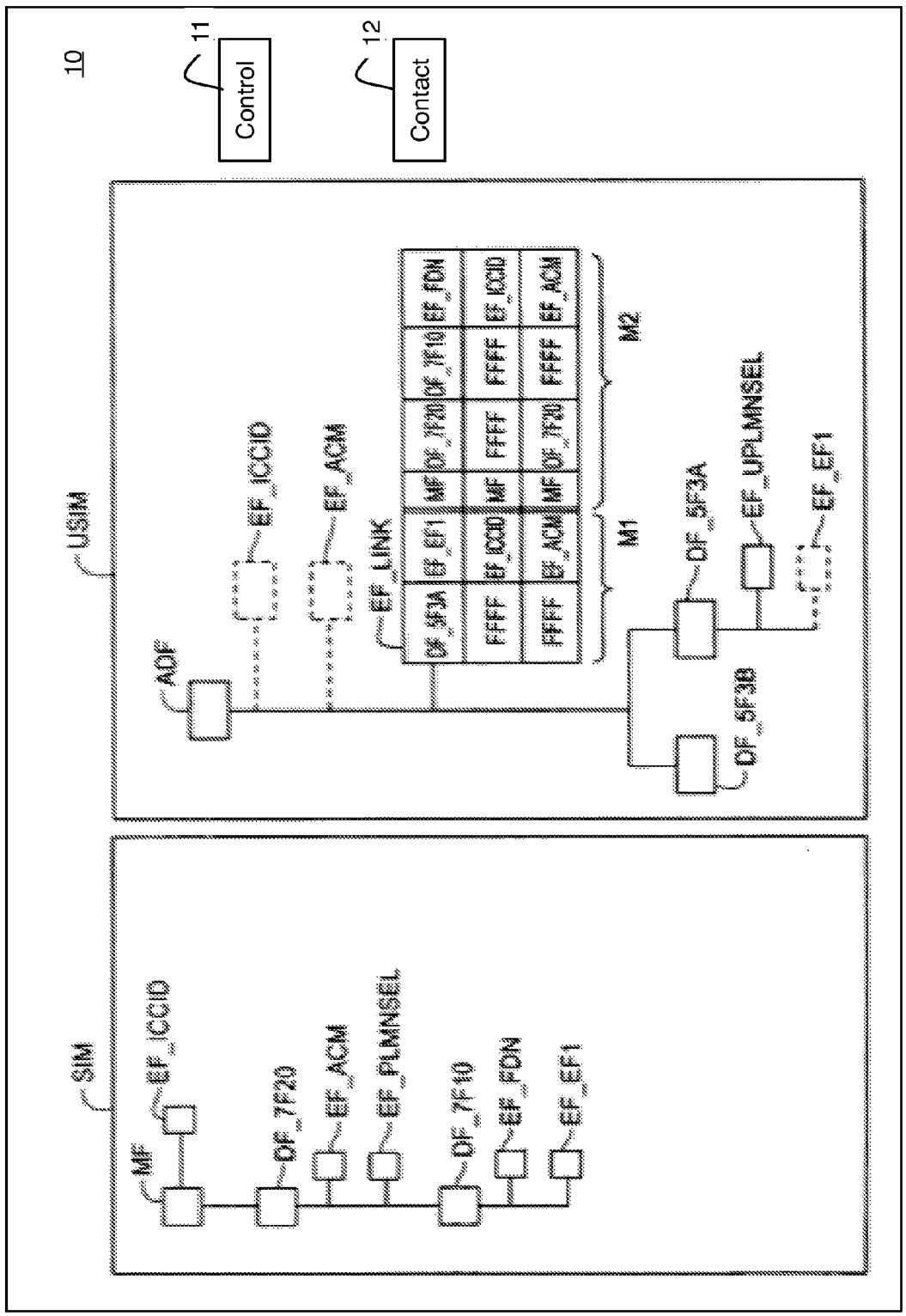
FIG. 4 is a diagram of a second method of producing the card of FIG. 1 according to the invention.

According to a second mode of realization, the second USIM memory includes a link file EF_LINK comprising an indication of the path to at least one file in the other SIM memory. As shown on FIG. 4, the path of the telephone number file EF_FDN in the first SIM memory is MF, DF_7F20, DF_7F10, EF_FDN. The link file EF_LINK also includes an indication of the path of the corresponding file in the second USIM memory, i.e. the file EF_EF1 whose path is DF_5F3A, EF_EF1. The same applies for the identification number file EF_ICCID and for the counter file EF_ACM whose respective paths in the first SIM memory are MF, FFFF, FFFF, EF_ICCID and MF, DF_7F20, FFFF, EF_ACM and in the second USIM memory are FFFF, EF_ICCID, and FFFF, EF_ACM. For each path in the first SIM memory and the second USIM memory, respective memory areas M1 and M2 are used, respectively of n and m+1 words, n≧0, m>0, n and m being a number of folder selections to be made before reaching the required file, starting from the main folder, more generally called a number of levels in a file tree structure. When a file is stored directly in the main folder, for example, the identification number file EF_ICCID is in the main folder MF, n−1 words of the path are set to a value FFFF for a target memory and m−2 words are set to FFFF for a source memory. In fact, the link file EF_LINK is in the second USIM memory which is the source memory. In the indications of the file paths in the source memory, therefore, it is not necessary to indicate the main folder ADF. This therefore requires one word less in memory as compared with the first mode of realization.

Figure 5:
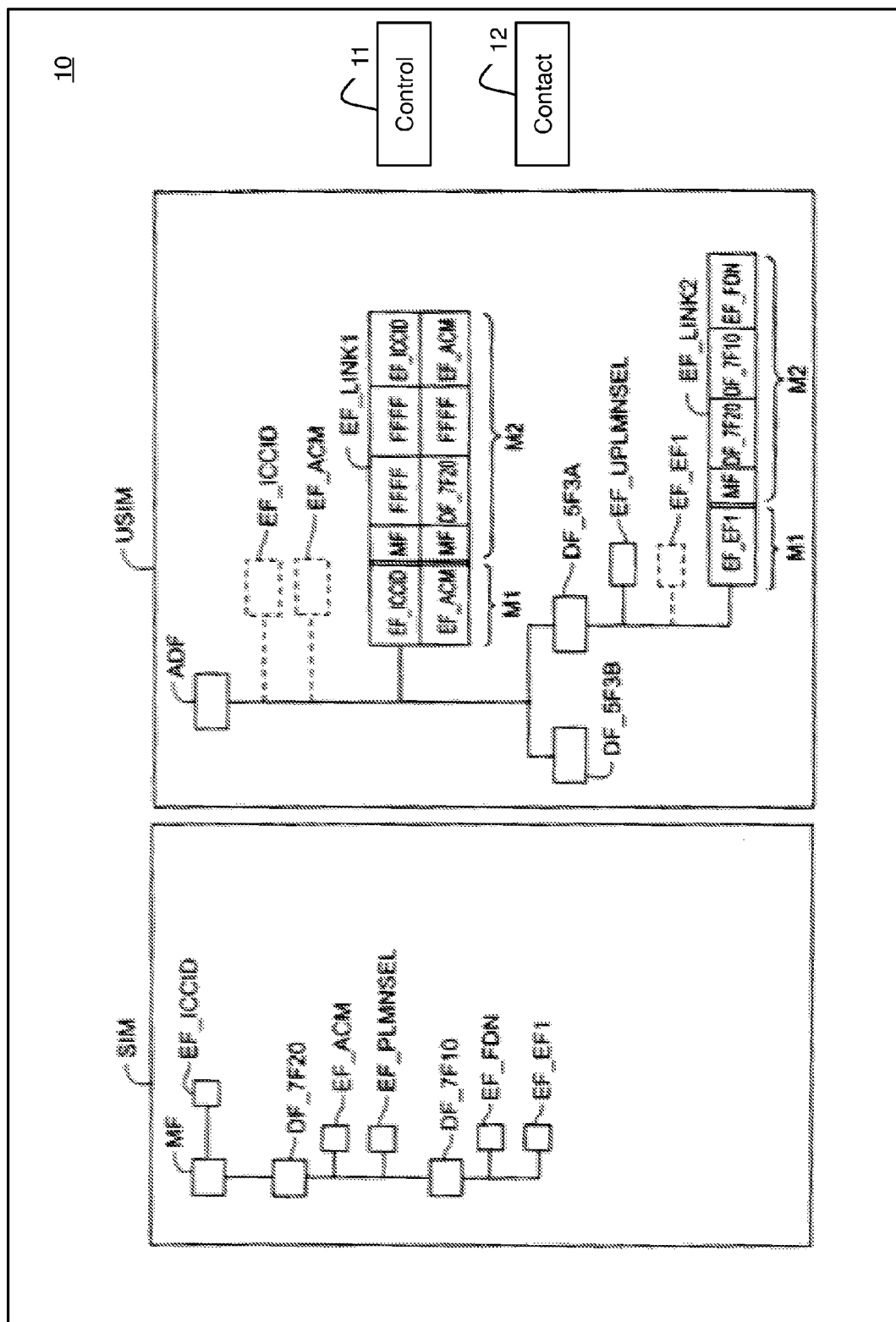
FIG. 5 is a diagram of the third method of producing the card of FIG. 1 according to the invention.

According to a third mode of realization, the second USIM memory includes several link files EF_LINK comprising an indication of the path to at least one file in the other memory. As shown on FIG. 5, each virtual data file in a folder is associated with a link file EF_LINK in the same folder.

The unique identification number file EF_ICCID and the unit counter file EF_ACM of the card are associated with a first link file EF_LINK1 stored in the main folder ADF. The indication of the source path is simply represented by the file identifier, whereas the indication of the target path is MF, FFFF, FFFF, EF_ICCID for the first file EF_ICCID and MF, DF_7F20, FFFF, EF_ACM for the second file EF_ACM.

The telephone number file EF_EF1 is associated with a second link file EF_LINK2 stored in the second folder DF_5F3A. The indication of the source path is simply represented by the identifier of the file EF_EF1, whereas the indication of the target path is MF, DF_7F20, DF_7F10, EF_FDN for the said file EF_EF1. For a first memory area M1 therefore, we use only one word, whereas for a second memory area M2, m+1 words are used, m>0.

Once again, therefore, fewer words in memory are used compared with the first and second modes of realization.

A second advantage of the device of this invention is that this type of file sharing is carried out in the smart card. This file management does not involve modifying any operating system in a portable telephone. A portable telephone and a card each have an operating system which can be used to exchange data or instructions between them. Generally, a file is selected in the card using the operating system of the portable telephone. With the device of this invention, the true file is selected transparently for the operating system of the portable telephone. For example, when the telephone number file EF_EF1 of the second USIM memory is selected, or when data is retrieved from this file using the operating system of the telephone, there is no indication that this file does not physically exist in the second USIM memory. The card operating system selects the corresponding file EF_FDN of the first SIM memory and sends the data of the said file to the operating system of the telephone, transparently for this operating system.

Note that according to the various modes of realization described above, a memory comprises an indication of the path of a file in the other memory and also an indication of the path of an actual file in order to set up a mapping between a physical file and a virtual file, a path indication preferably including at least one file identifier. In other words, a memory comprises an indication of the path of a target file in a target memory and also an indication of the path of a source file in a source memory.

A third advantage of the device of this invention is that an indication of a file path preferably comprises one or more file identifiers. It preferably comprises the identifiers of the files to be selected first to reach a particular file and the identifier of the file to be reached. This offers the advantage of not having to implement complex means to update the path indications if they should include the memory addresses of the various files. Whenever a size file is modified, in fact, for a path indication including the addresses of the various files to be selected to reach the said file, the link file(s) EF_LINK would have to be updated. This problem is avoided with an indication which includes a file identifier.

According to the third mode of realization, a particular file in a source memory, i.e. a virtual file, is selected via the card operating system. It includes the following steps:
1 look for a link file EF_LINK in the current folder (the current folder is the one where you are at present),
1.1 if the link file EF_LINK is found, look for the identifier of the source file in the said link file,
1.1.1 if the identifier is found, select the physical file in the target memory using the path indication by first selecting all the files indicated in the path indication,
1.1.2 if the identifier is not found, move to step 1.2.
1.2 if the link file EF_LINK is not found, look for this source file in the current folder,
1.2.1 if the source file is in the current folder, then select the file and send a selection message to the operating system of the portable telephone,
1.2.2 if the source file is not in the current folder, then send an error message to the operating system of the portable telephone.

According to the first and second modes of realization, a file is selected according to the same above-mentioned principle. However, for the first mode of realization, a link file EF_LINK is sought in the main folder MF of the target memory directly, in this case the first SIM memory. For the second mode of realization, a link file EF_LINK is sought in the main folder ADF of the source memory directly, in this case the second USIM memory.

Note that a file is selected, generally, via an identifier and a file size. When another file is selected a jump is made, equivalent to the size of the current file where you are, to go to another file. The file size can be written in a file header at the start of the said file, for example. If a file size is changed therefore, the new size is updated in the file but the path indications, which preferably only refer to the identifiers, are not updated.

Obviously, the modes of realization described above are not limiting and we can easily imagine that the shared files could be held in a third memory, not corresponding to any particular application, but simply acting as a shared memory for several different applications.

What is claimed is:

1. A programmable device for storing information pertinent to a first and second application, at least one of said two applications executing on a host device to which the programmable device is connected, comprising:
   a. a storage facility for storing a first storage area corresponding to the first application and a second storage area corresponding to the second application, wherein
   i. the first storage area contains a link file linking a path to a file location in the first storage area to a location in the second storage area; and
   b. a control program operable to receive file access commands from applications executing on the host device wherein in response to an application requesting access to a file in one of the first or second storage area that does not exist in said one of the first or second storage area using the link file to locate the corresponding file in the other of said first or second storage area.

2. The programmable device of claim 1 wherein the first storage area comprises data related to a network accessible by the first application and the second storage area comprises data related to a network accessible by the second application.

3. The programmable device of claim 2 wherein the programmable device is an integrated circuit device.

4. The programmable device of claim 2 wherein the first network is a GSM network and the second network is a UMTS network.

5. The programmable device of claim 4 wherein the programmable device is an integrated circuit device.

6. The programmable device of claim 2 wherein the first network is a UMTS network and the second network is a GSM network.

7. The programmable device of claim 6 wherein the programmable device is an integrated circuit device.

8. The programmable device of claim 2 wherein the first storage area is a SIM memory and the second storage area is a USIM memory.

9. The programmable device of claim 8 wherein the programmable device is an integrated circuit device.

10. The programmable device of claim 2 wherein the file in the first or second storage area that does not exist in said first or second storage area is a file that contains information that is intended to contain the same contents in the first and second storage area.

11. The programmable device of claim 10 wherein the programmable device is an integrated circuit device.

12. The programmable device of claim 2 wherein the file in the first or second storage area that does not exist in said first or second storage area is a file that contains data used by both the first and second application.

13. The programmable device of claim 12 wherein the programmable device is an integrated circuit device.

14. The programmable device of claim 1 wherein the programmable device is an integrated circuit device.

15. A method of locating a file addressed by a first application as being in a first storage area on a portable device wherein the first storage area corresponding to files related to a first network accessible by the first application, comprising
   a. requesting access to said file in the first storage area;
   b. determining that said file is not present in said first storage area;
   c. using a link file to determine a path indication mapping the path given for said file in said first storage area to a path for a corresponding file in a second storage area wherein said second storage area corresponds to files related to a network accessible by a second application and wherein said second file is intended to contain the same information as that of said first file; and
   d. allowing said first application to access said corresponding file in the second storage area.

16. The method of claim 15 wherein the first network is a GSM network and the second network is a UMTS network.

17. The method of claim 15 wherein the first network is a UMTS network and the second network is a GSM network.

18. The method of claim 15 wherein the first storage area is a SIM memory and the second storage area is a USIM memory.

19. The programmable device of claim 15 wherein the file in the first or second storage area that does not exist in said first or second storage area is a file that contains data used by both the first and second application.

\* \* \* \* \*